US 8,555,392 B2

(12) United States Patent
Golovkin

(10) Patent No.: US 8,555,392 B2
(45) Date of Patent: Oct. 8, 2013

(54) SYSTEM AND METHOD FOR DETECTING UNKNOWN PACKERS AND CRYPTORS

(75) Inventor: Maxim Y. Golovkin, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 13/527,511

(22) Filed: Jun. 19, 2012

(65) Prior Publication Data

US 2013/0227300 A1 Aug. 29, 2013

(30) Foreign Application Priority Data

Feb. 24, 2012 (RU) ................................ 2012106466

(51) Int. Cl.
G06F 11/00 (2006.01)
G06F 12/14 (2006.01)
G06F 12/16 (2006.01)
(52) U.S. Cl.
USPC .......................................................... 726/24
(58) Field of Classification Search
USPC .......................................................... 726/24
See application file for complete search history.

(56) References Cited

U.S. PATENT DOCUMENTS

| | | | |
|---|---|---|---|
| 5,790,778 A | 8/1998 | Bush et al. | |
| 5,794,012 A | 8/1998 | Averill | |
| 5,826,013 A * | 10/1998 | Nachenberg | 726/22 |
| 6,357,008 B1 * | 3/2002 | Nachenberg | 726/24 |
| 6,415,436 B1 | 7/2002 | Patel | |
| 6,775,780 B1 * | 8/2004 | Muttik | 726/24 |
| 6,971,017 B2 * | 11/2005 | Stringer et al. | 713/182 |
| 6,973,577 B1 | 12/2005 | Kouznetsov | |
| 7,415,726 B2 | 8/2008 | Kelley et al. | |
| 7,418,729 B2 | 8/2008 | Szor | |
| 7,434,105 B1 | 10/2008 | Rodriguez-Rivera et al. | |
| 7,568,233 B1 | 7/2009 | Szor et al. | |
| 7,647,636 B2 | 1/2010 | Polyakov et al. | |
| 7,657,419 B2 | 2/2010 | Van der Made et al. | |
| 7,779,472 B1 | 8/2010 | Lou | |
| 7,814,544 B1 | 10/2010 | Wilhelm | |
| 7,827,447 B2 | 11/2010 | Eberbach et al. | |

(Continued)

FOREIGN PATENT DOCUMENTS

GB 2439806 A 1/2008

OTHER PUBLICATIONS

Polychronakis, Emulation-based Detection of Non-self-contained Polymorphic Shellcode, Retrieved from the Internet <URL: ftp.ics.forth.gr/_pdf/brochures/nemu.raid07.pdf>, pp. 1-20 as printed.*

(Continued)

*Primary Examiner* — Saleh Najjar
*Assistant Examiner* — Michael Chao
(74) *Attorney, Agent, or Firm* — Arent Fox LLP; Michael Fainberg

(57) ABSTRACT

Disclosed are systems, methods and computer program products for detecting unknown packers and cryptors. An example method comprises emulating execution of a software object modified by an unknown packer or cryptor; collecting information about memory operations performed during the emulation; combining information about a plurality of related memory operations into at least one sequential set of memory operations; identifying from the at least one sequential set of related memory operations one or more high-level operations associated with unpacking or decryption of the emulated object; and generating based on the one or more high-level operations a record of the unknown packer or cryptor to be used for detecting the unknown packer or cryptor.

20 Claims, 4 Drawing Sheets

(56) References Cited

U.S. PATENT DOCUMENTS

| | | | |
|---|---|---|---|
| 7,836,504 | B2 | 11/2010 | Ray et al. |
| 2002/0078368 | A1* | 6/2002 | Yann et al. ................... 713/200 |
| 2002/0091934 | A1* | 7/2002 | Jordan ......................... 713/188 |
| 2002/0147969 | A1 | 10/2002 | Lethin et al. |
| 2005/0223238 | A1 | 10/2005 | Schmid et al. |
| 2008/0201129 | A1 | 8/2008 | Natvig |
| 2008/0209562 | A1* | 8/2008 | Szor .............................. 726/24 |
| 2011/0041179 | A1 | 2/2011 | Ståhlberg |

OTHER PUBLICATIONS

Zhang et al., Unknown Malicious Codes Detection Based on Rough Set Theory and Support Vector Machine, 2006, Retrieved from the Internet <URL: ieeexplore.ieee.org/xpls/abs_all.jsp?arnumber=1716444>, pp. 1-5 as printed.*

Partk et al., A similarity based Technique for Detecting Malicious Executable files for Computer Forensics, 2006, Retrieved from the Internet <URL: ieeexplore.ieee.org/xpls/abs_all.jsp?arnumber=4018488>, pp. 1-6 as printed.*

Jacob et al., Malware Detection using Attribute-Automata to parse Abstract Behavioral Descriptions, 2009, Retrieved from the Internet <URL: arxiv.org/pdf/0902.0322v1.pdf>, pp. 1-19 as printed.*

Zhang, Unknown Malicious Codes Detection Based on Rough Set Theory and Support Vector Machine, 2006, Retrieved from the Internet <URL: ieeexplore.ieee.org/xpls/abs_all.jsp?arnumber=1716444>, pp. 1-5 as printed.*

Park, A similarity based Technique for Detecting Malicious Executable files for Computer Forensics, 2006, Retrieved from the Internet <URL: ieeexplore.ieee.org/xpls/abs_all.jsp?arnumber=4018488>, pp. 1-6 as printed.*

European Search Report from the corresponding EP Application No. 12177005.

Search Report from counterpart RU application 2012106466.

Fanglu Guo et al. "A Study of the Packer Problem and Its Solution", Feb. 6, 2011, found at UTL: http://www.ecsl.cs.sunysb.edu/tr/TR237.pdf.

Christodorescu et al. "Semantics-Aware Malware Detection", 2005 IEEE Symposium on Security and Privacy.

* cited by examiner

SYSTEM AND METHOD FOR DETECTING UNKNOWN PACKERS AND CRYPTORS

CROSS-REFERENCE TO RELATED APPLICATIONS

This application claims benefit of priority under 35 U.S.C. 119(a)-(d) to a Russian Application No. 2012106466 filed on Feb. 24, 2012, which is incorporated by reference herein.

TECHNICAL FIELD

The present disclosure generally relates to the field of computer security, and specifically to systems, methods and computer program products for detecting unknown packers and cryptors used to conceal malicious software.

BACKGROUND

Development in computer and Internet technologies has ever-increasing impact on human society and our way of life. Personal computers, laptops, tablets, smart phones and other communication devices provide instant access to information anywhere in the world. E-mail, instant messaging, IP telephony and social networks allow people to communicate and share information with each other. However, this growth in computer and communication technologies has fueled the emergence and spread of computer malware, such as viruses, worms, Trojans, etc., which are used by cybercriminals for various malicious purposes.

Typical malicious activities can range from banal hooliganism to serious cybercrimes, such as stealing of financial assets from bank accounts, and even cyber terrorism against nations. Also, cybercriminals constantly develop new methods for deploying malware on computer systems. For example, cybercriminals actively use fresh vulnerabilities and make use of social engineering approaches, which, due to the development of social networks and other communication tools, have become especially popular among virus writers. Cybercriminals also constantly search for new ways to circumvent security and antivirus application.

The majority of executable files under study at the present time, also including malicious ones, are so-called PE files (Portable Executable) and have the PE format (for the Windows® family of operating systems, under which most malware is written). In order that an antivirus application does not detect a malicious executable file during antivirus scan, virus writers employ special applications—packers and cryptors—which allow the code of a malware executable file to be compressed, encrypted, and otherwise modified, in an attempt to thwart detection of the malware by antivirus applications.

A packer is a program that reduces the size of an executable file using compression. Particularly, during packing of a file, a compressed copy of the original file and an unpacking program are written into a compressed file. After the compressed file is launched on a user's computer, the unpacker extracts the original program code from the archive to system memory and transfers control to the unpacked program code. Many unpackers launch the file and create an unpacked version of the file from the image loaded in the system memory. However, if the file contained a virus, the user's computer could get infected. In addition, unpackers have a number of different ways of preventing the detection of malicious code by an antivirus application, for example, by only partially unpacking the code when file is launched.

A cryptor is a program that encrypts executable files to hide their functionality from antivirus scanning engines, such as heuristic and signature analyzers. By means of a cryptor, for instance, an original program file is encrypted and code is written into its header, which, upon launch, performs the decryption and executes the decrypted program. The simplest example is the spread of viruses or Trojan-horse applications in encrypted and password-protected archives, which cannot be detected by antivirus programs.

Packed and/or encrypted malware is hard to detect using conventional detection techniques. Therefore, mechanisms for detecting packed/encrypted malware are necessary.

SUMMARY

Disclosed are systems, methods and computer program products for detecting unknown packers and cryptors. In one example embodiment, a method comprises emulating execution of a software object modified by an unknown packer or cryptor; collecting information about memory operations performed during the emulation; combining information about a plurality of related memory operations into at least one sequential set of memory operations; identifying from at least one sequential set of related memory operations one or more high-level operations associated with unpacking or decryption of the emulated object; and generating based on the one or more high-level operations a record of the unknown packer or cryptor to be used for detecting the unknown packer or cryptor.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

In the drawings.

DETAILED DESCRIPTION OF EXAMPLE EMBODIMENTS

Example embodiments of the present invention are described herein in the context of systems, methods and computer program products for detecting unknown packers and cryptors. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
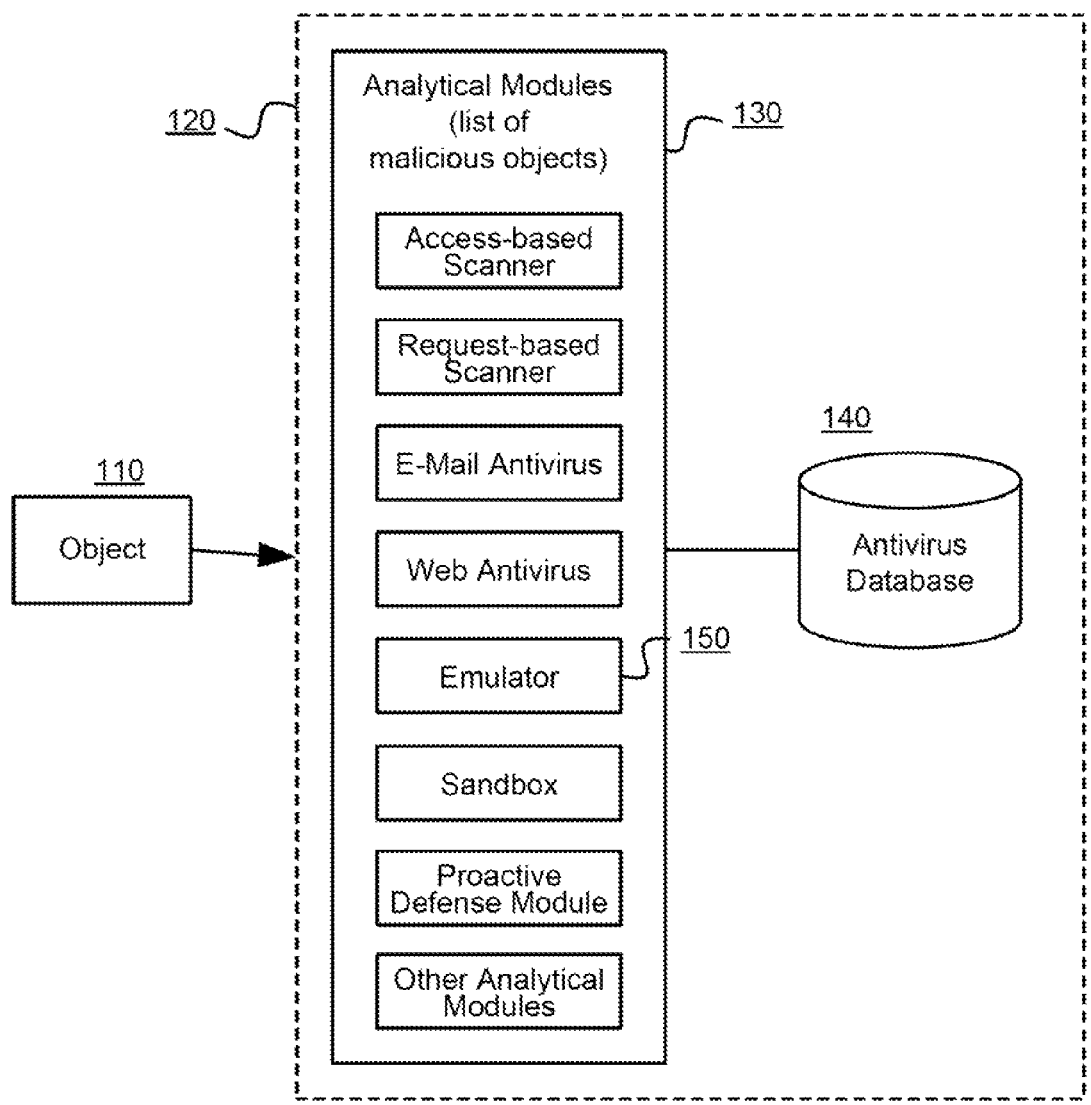
FIG. 1 illustrates a block diagram of a system for detecting malware according to one example embodiment.

FIG. 1 illustrates a diagram of a system for detecting malware according to one example embodiment. A system includes an antivirus application 120 which contains several analytical modules 130 for emulation and analysis of software objects 110 for presence of malware. The antivirus application 120 also includes an antivirus database 140, which contains antivirus records. Analytical modules 130 use antivirus records to perform antivirus analysis of software objects 110. Antivirus records may include, for example, malware signatures, heuristic rules, malware behavior algorithms, and other types of information about malware. Different analytical modules 130 may use different antivirus records to analyze different types of software objects 110, such as executable files, scripts, macros, data files, e-mails, URLs and other types of software objects. Several analytical modules can also jointly or separately perform analysis of object 110 for presence of malware.

The analytical modules 130 may include an emulation module 150 configured to analyze packed and/or encrypted objects 110 (hereinafter, modified objects). The purpose of this analysis is to identify a packer or cryptor that modified object 110, to determine the malicious nature of the unpacked and decrypted object 110, and to identify new types of packers and cryptors. It must be noted that the emulation module 150 can also check objects that are not packed or encrypted, but are recognized as suspicious based on the results of a check by other analytical modules 130.

Figure 2:
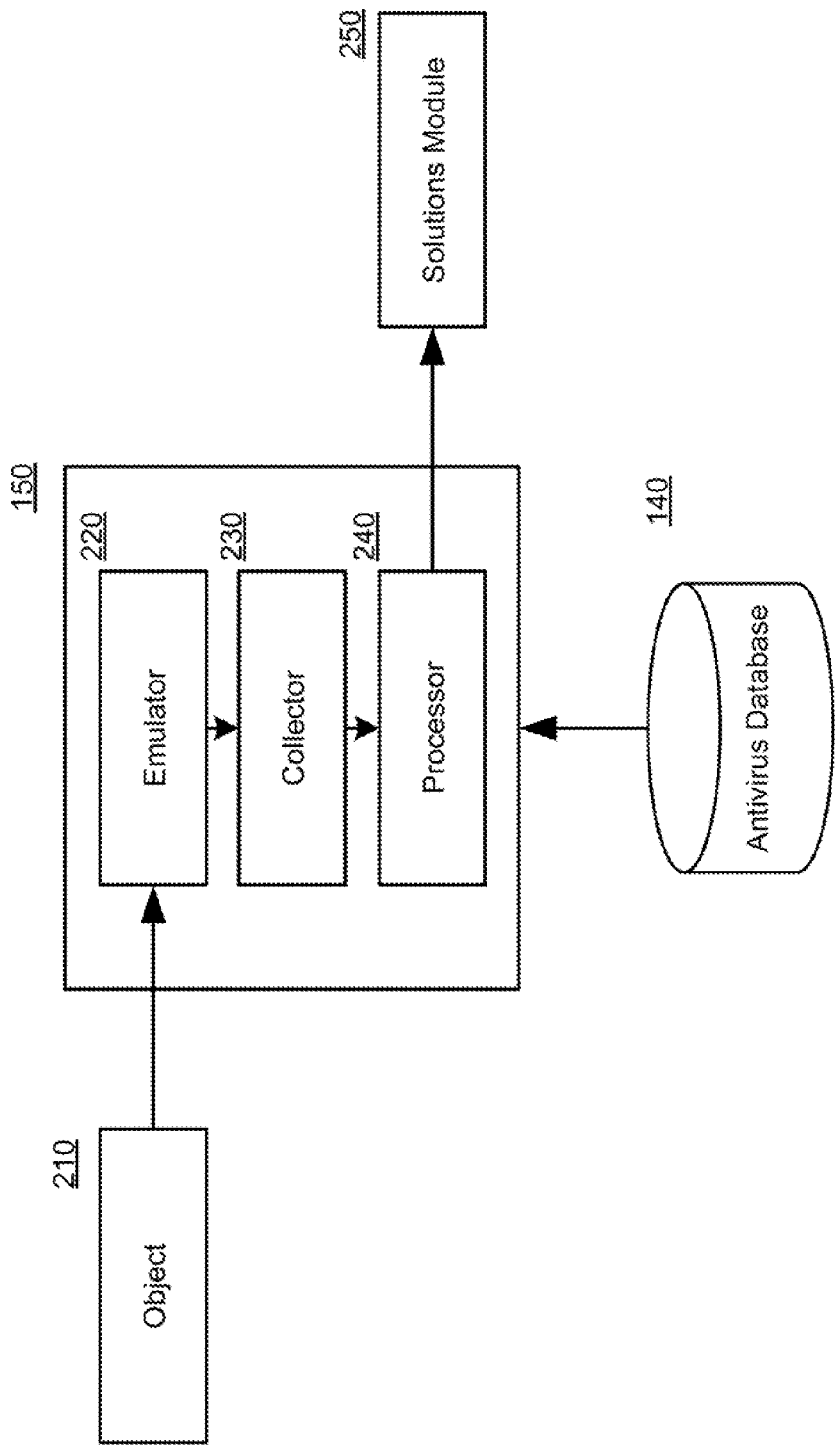
FIG. 2 illustrates a detailed block diagram of the system for detecting unknown packers and cryptors according to one example embodiment.

FIG. 2 illustrates a schematic configuration of the system for the detection of unknown packers and cryptors. The system described hereinafter is designed to detect the modification of a software object by an unknown packer or cryptor, analyze their behavior, and generate antivirus records that allow these packers and cryptors to be detected in the future. When downloaded on the PC, software object 210 modified by an unknown packer or cryptor is first analyzed using an emulation module 150 of antivirus application 120.

In one example embodiment, the emulation module 150 may include an emulator 220, a collector 230 and a processor 240. It should be noted that in other embodiments, the emulator 220, collector 230 and processor 240 are not part of the emulation module 150, but implemented as separate modules. In one example embodiment, the emulator 220 is configured to perform at least the following operations: emulate object 210 in a secure virtual computer environment; unpack and/or decrypt modified object 210; analyze unpacked/decrypted object 210 using heuristic rules for presence of malicious code; and search object 210 for presence of malicious segments of program code using malware signatures.

In one example embodiment, the emulator 220 is capable of performing various known emulation mechanisms. Such mechanisms can be, for example, parsing the program code into instructions and imitating their execution in a virtual environment. One example embodiment of emulation mechanism is disclosed in a commonly owned U.S. Pat. No. 7,620,992, which is incorporated by reference herein.

The emulation module 150 is connected to an antivirus database 140 which contains various antivirus records used by the analytical modules 130 of the antivirus application. In addition, the antivirus database 140 contains a set of antivirus records containing signatures and behavioral algorithms of known packers and cryptors. These records are used by the emulator 220 to determine whether an object was modified by a known packer or cryptor.

In one example embodiment, the antivirus database 140 also contains preliminary antivirus records used to determine whether an emulated object 210 was modified by an unknown packer or cryptor. The preliminary antivirus records specify certain identifying characteristics of different types of packers and cryptors. Such identifying characteristics may include, but not limited to, reading of memory areas used by OS modules, such as kernel32.dll, user32.dll and ntdll.dll, and reading of specific OS data structures, such as PebLdrData, which contains information about all of the loaded modules of system processes and which is often used by malicious packers for concealing use of API functions. Also, different families of packers and cryptors perform specific operations, which can be used to identify them. Therefore, the antivirus database 140 can also contains preliminary antivirus records identifying certain specific operations common to different types of packers and cryptors that can be used to determine during emulation of object 210 that the object was modified by an unknown packer or cryptor of a certain type, such as, MPRESS, CExe, UPX, PESpin, etc.

In one example embodiment, if during emulation of a modified object 210, the emulator 220 detects in the behavior of the emulated object 210 identifying characteristics or operation specified in the preliminary antivirus records, which are associated with unknown packer or cryptor, then the emulator 220 activates the collector 230 and processor 240 and restarts emulation of the modified object 210 from the beginning. Therefore, detection of characteristics or operations specified in the preliminary antivirus records triggers the collector 230 to start collecting information about memory-related operations of emulated object 210.

When the emulator 220 restarts emulation of the modified object 210, the collector 230 will record in a log all memory-related operations, such as read and write operations, combine the recorded memory operations into one or more sequential sets of related operations, and send these sets of operations to the processor 240. The sequential sets of related memory operations will be referred hereinafter as chains of operations. Each chain of operations is constructed by the collector 230 based on the addresses of the operations. A number of similar operations can be included in the same chain. Each operation has its own address of the start of the operation and its size (known as an address space). The collector 230, when combining related memory operations into a chain, searches the address space of operations to find the most suitable operations for combining into a single chain of operations. The collector 230 can combine the two memory operations if their address spaces relates. For example, the start address of one operation corresponds to the end address of another operation, or when two operations access (e.g., read or write) the same address space.

Presented below are two sample chains A and B of memory operations collected and combined by the collector 230 according to the principles described above:

A. 16871; WRITE; FRWD; (4): Address=40A5D8; Size=26BC0; Data=66EBF2B2B90ACCE8; Data=[0-FFFFFFFF]; EIP=[431FBB-431FD2]; TIME=[3F160-82DEE]; API=[4-4].

B. 16870; READ; FRWD; (4): Address=40A5D8; Size=26BC0; Data=142DBA9052BD9EFF; Data=[7839-FFFFB9F6]; EIP=[431FBD-431FD2]; TIME=[3F161-82DEE]; API=[4-4].

These two chains contain data associated with memory operations (i.e., READ and WRITE) that were performed in the same address space (i.e., Address=40A5D8; Size=26BC0). These operations were combined by the collector 230 because they were performed in the same address space. Each line of the chain contains similar data associated with the operation. Each chain contains the following data, arranged from left to right: unique identifier of the chain; type of operation; direction of the operation; size of the element of data on which operation is performed; address on which operation is performed; size of data; hash sum of the data; size of the minimum and maximum element of the chain; minimum and maximum address of EIP register; number of processor commands executed during lifespan of the chain; and number of API functions executed during lifespan of the chain.

The processor 240, after receiving the data combined into chains from the collector 230, determines the high-level operations that were performed during unpacking or decryption of the object 210 during its emulation by the emulator 220. Thus, the processor 240 determines, during emulation of the object 210, which high-level operations performed by an unknown packer or cryptor that modified the object 210. The high-level operations are determined by the processor 240 based on analysis of the recorded memory operations during execution of the modified object 210, information about which was collected and combined by the collector 230. The high-level operations are determined by the processor 240 based, for example, on heuristic rules contained in the processor 240 and/or antivirus database 140. The processor 240 compares the chains of memory operations with heuristic rules to identify high-level operations associated with unpacking and/or decrypting of the emulated object 210. Such high-level operations and the corresponding heuristic rules may include, but not limited to:

| High-Level Operation (description) | Heuristic Rule |
|---|---|
| decrypt (decryption) | modification of data, where the size of receiver data array (decrypted data) is equal to the size of source data array (encrypted data) |
| unpack (unpacking) | modification of data, where the size of receiver data array (unpacked data) is larger than the size of source data array (packed data) |
| decode (decoding) | modification in data, where the size of the receiver data array (decoded data) is smaller than the size of the source data array (encoded data) |
| put (write) | writing data, source unknown |
| filter (filtration) | use of an optimizing E8/E9 filter, which allows better compression of data due to preliminary processing of data |
| import (import) | completing import tables of system modules |
| memcpy (copying) | copying a region of memory |
| memset (write) | writing identical data into a specified region of memory |
| getprocaddr (getting function addresses) | getting addresses of system functions by reading the export tables of system modules |
| fixup (setting up addresses) | setting up addresses of the object during its loading at the address different from the base address |

It must be noted that the processor 240 is also capable of determining precise operations on the basis of analysis of performed memory operations during emulation of the object 210, information about which was collected and combined by the collector 230, without the use of heuristic rules. Such precise operations can include, but not limited to such operations as:

jump (branch)—jump to another block of memory;
allocation (alloc)—allocating memory for an operation;
release (free)—release of memory;
loading (load)—loading of a module or library.

The parameters in the parenthesis include names of the high-level operations used by the processor 240 to further process the obtained chains of memory operations.

The processor 240 determines, based on the chains of memory operation, which high-level operations were performed during unpacking or decryption of the object 210 during emulation thereof and presents the processed data in the form of a following expression:

address: operation(dst, dst_size, src, src_size, op_size, direction, type); <weight>, in which address is the address of the high-level operation; operation is the name of a high-level operation; dst is the address of the receiver data array; dst_size is the size of the receiver data array; src is the address of the source data array; src_size is the size of data in the source data array; op_size is the size of the operation equal to size of one element of the array; direction is the direction of the processing of data array; type is a flag characterizing the operation; and weight is the average number of processor commands used for processing one element of the data array.

It must be noted that the above expression format is merely exemplary. Alternatively, the expression can be limited to the data that describes high-level operations only.

In one example embodiment, the address parameter in the above expression may be presented in the form of the combination of the address of the memory region and a displacement therein. The memory region may be designated using one of the following variables: image—memory module under the main file being emulated; mem—allocated memory; and mod—loaded modules and libraries. The size of data parameters in the above expression may be indicated using one of the following variables: byte, word, dword and qword. The direction of the event may be designated by the following variables: FRWD—forward; and BKWD—backward. The flag characterizing the operation may be designated by the following variables: DFLT—an ordinary event; POLY—an event requiring large number of instructions; API—concealed event, e.g., an API function call during decryption.

Using the above exemplary expression format, the processor 240 may generate the following expression from the sample chains of operations A and B:

image+0x00031FBD: decrypt(image+0x0000A5D8, image+0x0000A5D8, 0x00026BC0, DWORD, FRWD, DFLT); <000007>

Thus, after processing all chains of memory operations provided by the collector 230, the processor 240 will generate a sequence of expressions showing order of performed high-level operations during unpacking or decryption of object 210 during emulation thereof. In other words, this sequence of expressions describes the behavior of the unknown packer or cryptor that was used to modified object 210. For example, processor 240 may generate the following sequence of three expressions for a UPX (Ultimate Packer for eXecutables) packer:

Image+0x0083A180: unpack (image+0x000010000, 0x008384F6, image+0x0048C000, 0x003AE15D); <000033>

Image+0x0083A256: filter (image+0x000010000, 0x00745C1C); <000005>

Image+0x0083A281: import (image+0x000010000, image+00836000, 0x00003328); <000024>

Next, processor 240 provides the set of expressions describing the behavior of an unknown packer or cryptor to the solutions module 250. In one example embodiment, the solutions module 250 may not be part of the antivirus application 120 deployed on the user PC, but rather may be provided by the server of the antivirus software developer. After receiving from the processor 240 a set of expressions that describe the behavior of the unknown packer or cryptor, that is, information about high-level operations performed during unpacking or decryption of object 210, the solutions module 250 is capable of developing a record (e.g., an antivirus record) that can be used for detection of a modification of an object by this packer or cryptor based on characteristic high-level operations of said packer or cryptor. Solutions module 250 may use various known methods for creating records for quick detection of unknown packers or cryptors. For example, a record may be generated from a set of expressions by replacing in the set of expressions specific address locations with question marks, which allows detection of the packer based on the similarity of operations irrespective of their specific addresses. Using this technique, solutions module 250 may generate the following record from the expression formed based on chains A and B (illustrated above):

image+0x000?????: decrypt (image+0x0000????, image+0x0000????, 0x000?????, DWORD, FRWD, DFLT); <00000?>

Other techniques for generating records may be used in other embodiments of the invention.

In one example embodiment, human malware analysts can analyze sequences of expressions describing the behavior of unknown packer or cryptor to assist the solutions module 250 to generate records. For example, human analysts can be responsible for the development of records for the detection of an unknown packer or cryptor based on the sequences of expressions describing behavior of unknown packers or cryptors.

Figure 3:
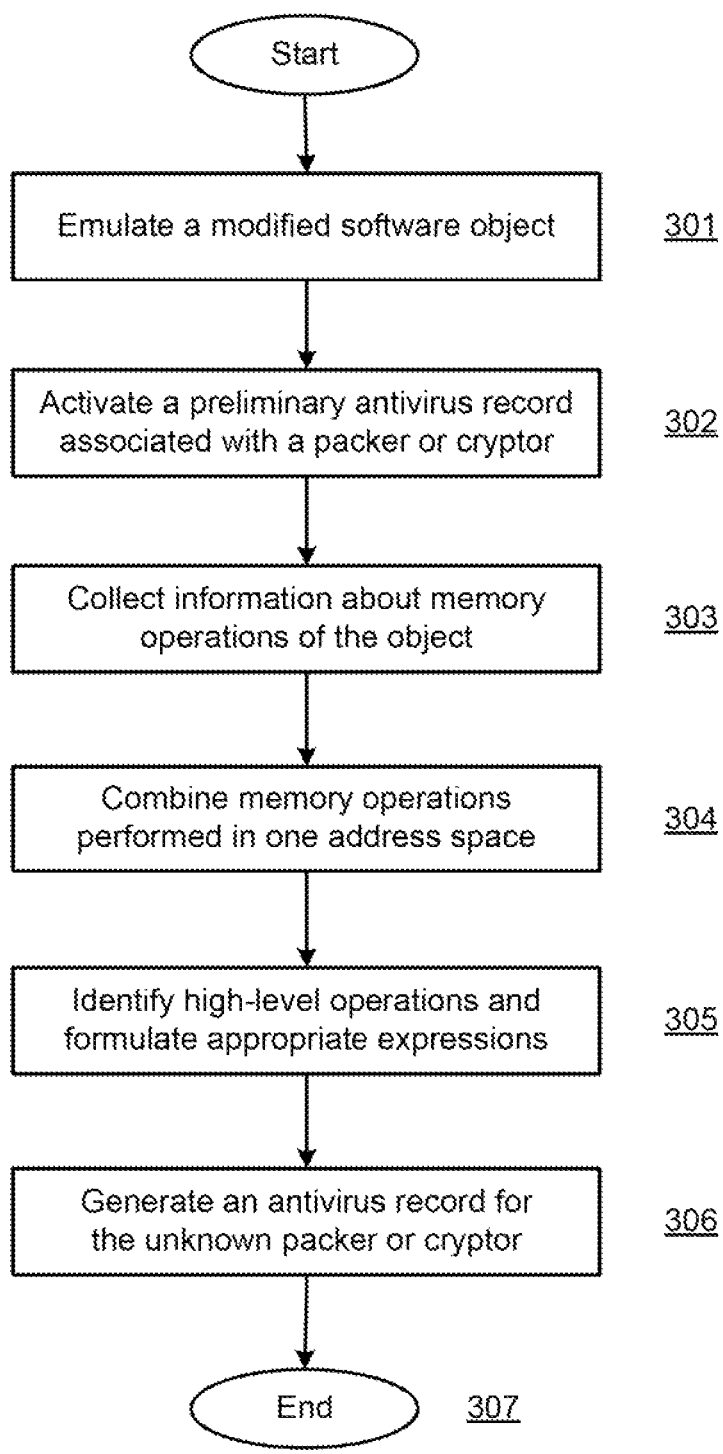
FIG. 3 illustrates a flow chart of a methodology for detecting unknown packers and cryptors according to one example embodiment.

FIG. 3 illustrates an algorithm of the operation of a system for the detection of unknown packers and cryptors. The basic goals of the system are detection of modifications of an object 210 by an unknown packer or cryptor, analysis of the behavior of this unknown packer or cryptor, and subsequent derivation of records for detection of this packer or cryptor. The operation of the system commences at step 301, at which emulator 220 of the emulation module 150 emulates object 210 and analyzes it for presence of malware as well as known packers and cryptors using antivirus records containing signatures and/or behavior patterns of known packers or cryptors provided by the antivirus database 140.

As stated earlier, the antivirus database 140 also contains preliminary antivirus records designed to determine, during the emulation, using the emulator 220, of the execution of the modified object 210, the fact that this object 210 was modified by an unknown packer or cryptor, based on those operations that are specific to packers or cryptors. If at step 302, during emulation a modified object 210 one of the preliminary antivirus records is activated by the emulator 220, in other words the emulator 220 detects in the behavior of the emulated object 210 identifying characteristics or operation specified in the activated preliminary antivirus record, then at stage 303, the emulator 220 activates the collector 230 and processor 240 and restarts emulation of the object 210. At step 303, the collector 230 records in a log information about memory operations performed during emulation of the object 210.

Next, at step 304, the collector 230, having recorded into a log information about detected memory operations, combines related memory operations into sequential sets of operations—chains of operations. Each chain combines operation based on the address of the operation. A number of similar operations may be included in the same chain. As explained above, each operation has its own address of the start of the operation and its size (known as an address space). The collector 230, when combining related memory operations into a chain, searches the address space of operations to find the most suitable operations for combining into a single chain of operations. The collector 230 can combine the two memory operations if their address spaces somehow relate to each other. For example, the start address of one operation corresponds to the end address of another operation, or when two operations access (e.g., read or write) in the same address space. Then, collector 230 forwards the generated chains of operations to the processor 240 for further processing.

At step 305, the processor 240 analyzes the chains of memory operations received from the collector 230 and identifies high-level operations performed during unpacking or decryption of the emulated object 210. In one example embodiment, the processor 240 determines the high-level operations performed on the emulated object 210 based on, for example, heuristic rules, maintained by the processor 240 or the antivirus database 140. The processor 240 presents information about identified high-level operations associated with unpacking or decryption of object 210 as a set of expressions that show sequence of high-level operations during unpacking or decryption of object 210.

Next, at step 306, the processor 240 forwards to the solutions module 250 the set of expressions describing the behavior of an unknown packer or cryptor used to modify object 210. After receiving from the processor 240 the indicated set of expressions which determines the behavior of the unknown packer or cryptor, i.e. information about the set of high-level operations performed during unpacking or decryption of object 210 during emulation thereof, the solutions module 250 generates an antivirus record, that allows detection of unknown packer or cryptor based on the characteristic high-level operations of said packer or cryptor. Operation of the system concludes at stage 307.

Figure 4:
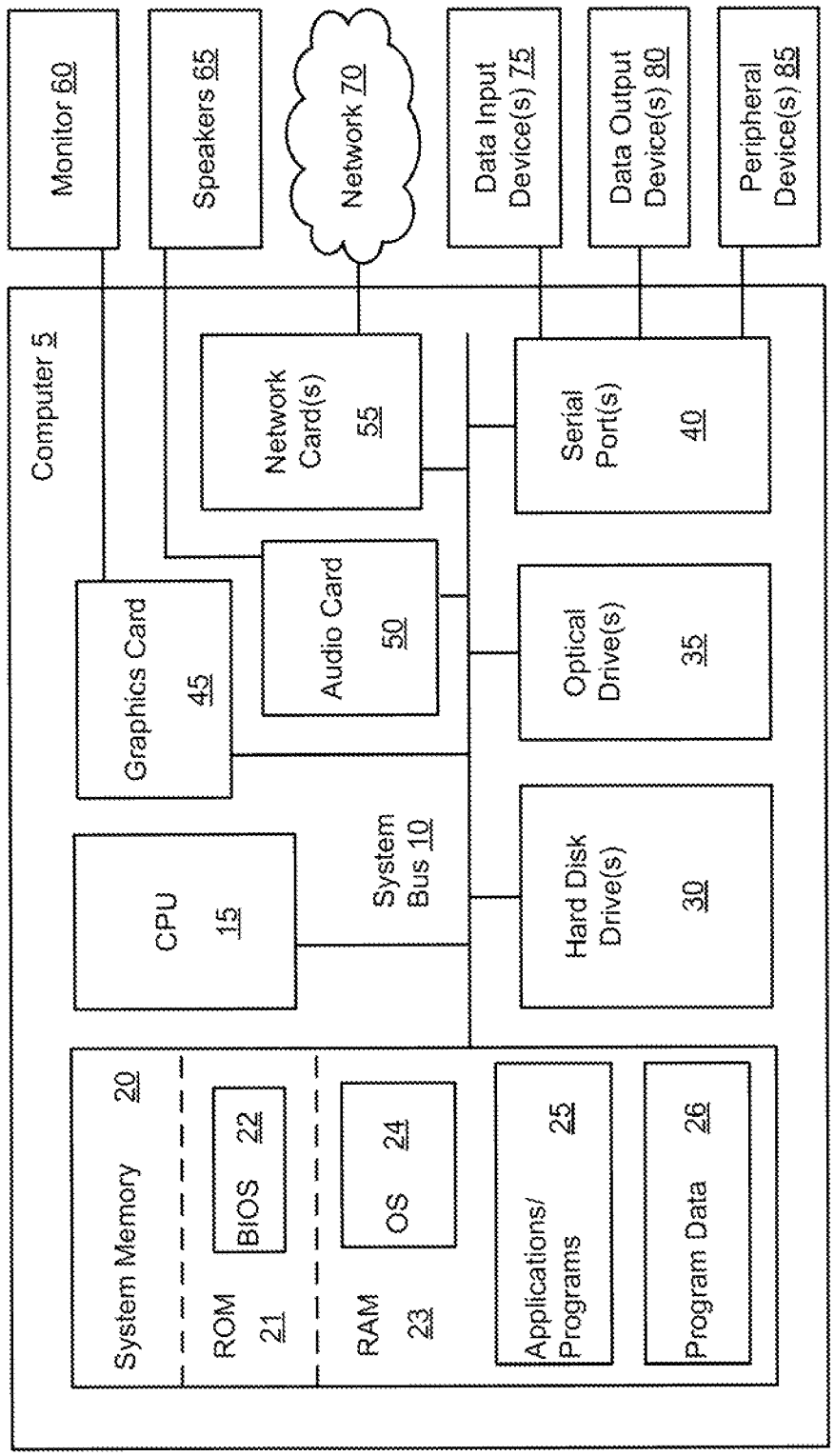
FIG. 4 illustrates a block diagram of a computer system in accordance with one example embodiment.

FIG. 4 depicts one example embodiment of a computer system 5, which could be used to implement the system for detection of malware modified by an unknown packers and cryptors. As shown, computer system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25, such as antivirus application 130. Memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are disclosed herein. It will be appreciated that in the development of any actual implementation of the invention, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detecting unknown packers and cryptors, the method comprising:
   emulating, by a computer processor, a software object modified by an unknown packer or cryptor;
   collecting information about memory operations performed during the emulation;
   combining information about related memory operations into one or more sets of related memory operations, wherein each set includes memory operations being related at least in their address spaces;
   comparing, by the computer processor, the one or more sets of related memory operations with high-level memory operations commonly associated with unpacking or decryption to identify at least one set of related memory operations that performs said high-level operations on the emulated object;
   generating, by the computer processor, based on at least one of the identified sets of related memory operations that perform unpacking or decryption of the emulated object, a new antivirus record that describes specific behavior of the unknown packer or cryptor that performs the unpacking or decryption of the emulated object,
   wherein the generated new antivirus record includes an ordered sequence of one or more expressions showing an order of the identified high-level operations with each expression identifying at least a high-level operation performed on the emulated object, and generic address space parameters of each high-level operation; and
   using the generated new antivirus record, by the computer processor, to detect another software object modified by said unknown packer or cryptor, including:
      obtaining information about high-level operations for said another software object; and
      comparing the ordered sequence of expressions contained in the new antivirus record with the obtained information about high-level operations irrespective of associated memory addresses of said high-level operations to determine whether said another software object is modified by said unknown packer or cryptor.

2. The method of claim 1, wherein emulating a software object modified by an unknown packer or cryptor further includes:
   detecting one or more memory operations associated with unpacking or decryption of the emulated software object; and
   restarting emulation of the software object.

3. The method of claim 1, wherein related memory operations include one or more of:
   two or more memory operations associated with the same address space; and two or more memory operations in which the start address of one memory operation corresponds to the end address of another memory operation.

4. The method of claim 1, wherein the collected information about memory operations includes one or more of: type of said operation; direction of said operation; scope of said operation; address of said operation; amount of data involved in said operation; hash sum of said data; minimum and maximum address of EIP register; number of processor commands executed on said data; and number of API functions associated with said data.

5. The method of claim 1, wherein comparing the one or more sets of related memory operations with high-level memory operations commonly associated with unpacking or decryption further includes:
comparing, by the computer processor, the one or more sets of related memory operations with heurist rules that describe common high-level memory operations associated with unpacking or decryption.

6. The method of claim 1, wherein each expression further identifies address and size of receiver data array; address and size of source data array; direction of processing of data; flag characterizing the high-level operation; and the average number of processor commands used for processing one element of the data array.

7. The method of claim 1, wherein each expression further identifies size of data parameters involved in each high-level operation and direction of each high-level operation.

8. A computer-implemented system for detecting unknown packers and cryptors, the system comprising:
a memory storing a software object; and
a processor coupled to the memory and being configured to:
emulate a software object modified by an unknown packer or cryptor;
collect information about memory operations performed during the emulation;
combine information about related memory operations into one or more sets of related memory operations, wherein each set includes memory operations being related at least in their address spaces;
compare the one or more sets of related memory operations with high-level memory operations commonly associated with unpacking or decryption to identify at least one set of related memory operations that performs said high-level operations on the emulated object;
generate based on at least one of the identified sets of related memory operations that perform unpacking or decryption of the emulated object, a new antivirus record that describes specific behavior of the unknown packer or cryptor that performs the unpacking or decryption of the emulated object,
wherein the generated new antivirus record includes an ordered sequence of one or more expressions showing an order of the identified high-level operations with each expression identifying at least a high-level operation performed on the emulated object, and generic address space parameters of each high-level operation; and
using the new generated antivirus record to detect another software object modified by said unknown packer or cryptor, including:
obtain information about high-level operations for said another software object; and
compare the ordered sequence of expressions contained in the new antivirus record with the obtained information about high-level operations irrespective of associated memory addresses of said high-level operations to determine whether said another software object is modified by said unknown packer or cryptor.

9. The system of claim 8, wherein to emulate a software object modified by an unknown packer or, cryptor, the processor being further configured to:
detect one or more memory operations associated with unpacking or decryption of the emulated software object; and
restart emulation of the software object.

10. The system of claim 8, wherein related memory operations include one or more of:
two or more memory operations associated with the same address space; and
two or more memory operations in which the start address of one memory operation corresponds to the end address of another memory operation.

11. The system of claim 8, wherein the collected information about memory operations includes one or more of: type of said operation; direction of said operation; scope of said operation; address of said operation; amount of data involved in said operation; hash sum of said data; minimum and maximum address of EIP register; number of processor commands executed on said data; and number of API functions associated with said data.

12. The system of claim 8, wherein to compare the one or more sets of related memory operations with high-level memory operations commonly associated with unpacking or decryption, the processor being further configured to:
compare the one or more sets of related memory operations with heurist rules that describe common high-level memory operations, associated with unpacking or decryption.

13. The system of claim 8, wherein each expression further identifies address and size of receiver data array; address and size of source data array; direction of processing of data; flag characterizing the high-level operation; and the average number of processor commands used for processing one element of the data array.

14. A computer program product embedded in a non-transitory computer-readable storage medium, the computer-readable storage medium comprising computer-executable instructions for detecting unknown packers and cryptors, the medium comprising instructions for:
emulating a software object modified by an unknown packer or cryptor;
collecting information about memory operations performed during the emulation;
combining information about related memory operations into one or more sets of related memory operations, wherein each set includes memory operations being related at least in their address spaces;
comparing the one or more sets of related memory operations with high-level memory operations commonly associated with unpacking or decryption to identify at least one set of related memory operations that performs said high-level operations on the emulated object;
generating based on at least one of the identified sets of related memory operations that perform unpacking or decryption of the emulated object, a new antivirus record that describes specific behavior of the unknown packer or cryptor that performs the unpacking or decryption of the emulated object,
wherein the generated new antivirus record includes an ordered sequence of one or more expressions showing an order of the identified high-level operations with each expression identifying at least a high-level operation performed on the emulated object, and generic address space parameters of each high-level operation; and using the new generated antivirus record to detect another software object modified by said unknown packer or cryptor, including:

obtaining information about high-level operations for said another software object; and comparing the ordered sequence of expressions contained in the new antivirus record with the obtained information about high-level operations irrespective of associated memory addresses of said high-level operations to determine whether said another software object is modified by said unknown packer or cryptor.

15. The system of claim 8, wherein each expression further identifies size of data parameters involved in each high-level operation and direction of each high-level operation.

16. The product of claim 14, wherein instructions for emulating a software object modified by an unknown packer or cryptor further include instructions for:

detecting one or more memory operations associated with unpacking or decryption of the emulated software object; and restarting emulation of the software object.

17. The product of claim 14, wherein related memory operations include one or more of:

two or more memory operations associated with the same address space; and two or more memory operations in which the start address of one memory operation corresponds to the end address of another memory operation.

18. The product of claim 14, wherein the collected information about memory operations includes one or more of: type of said operation; direction of said operation; scope of said operation; address of said operation; amount of data involved in said operation; hash sum of said data; minimum and maximum address of EIP register; number of processor commands executed on said data; and number of API functions associated with said data.

19. The product of claim 14, wherein instructions for comparing the one or more sets of related memory operations with high-level memory operations commonly associated with unpacking or decryption further include instructions for:

comparing the one or more sets of related memory operations with heurist rules that describe common high-level memory operations associated with unpacking or decryption generating a plurality of sequential expressions containing information about one or more high-level operations associated with at least one of unpacking of the object and decrypting of the object.

20. The product of claim 14, wherein each expression further identifies address and size of receiver data array; address and size of source data array; direction of processing of data; flag characterizing the high-level operation; and the average number of processor commands used for processing one element of the data array.

* * * * *